Patented Apr. 22, 1924.

1,491,275

UNITED STATES PATENT OFFICE.

ELMER H. RECORDS, OF MASONIA, IDAHO.

LIQUID FUEL.

No Drawing.   Application filed July 17, 1923.  Serial No. 652,181.

*To all whom it may concern:*

Be it known that I, ELMER H. RECORDS, a citizen of the United States, residing at Masonia, in Shoshone County and State of Idaho, have invented certain new and useful Improvements in a Liquid Fuel, of which the following is a specification.

My present invention relates to an improved liquid fuel having an alcoholic base, for use in internal combustion engines, as a combustible motive fluid, and adapted for introduction to the cylinder of the internal combustion engine through the usual form of carbureter.

By the utilization of my invention I provide a combustible liquid fuel which maintains itself in liquid state at all times ready for use; which is volatile and readily carbureted, and which possesses an exceedingly high explosive power at a comparatively lower temperature than usually accompanies the use of gasoline for instance, or other similar liquid fuels.

In the accompanying specification I have set forth an example of my invention wherein an alcoholic base is used and the necessary ingredients are chemically combined therewith for producing the liquid fuel.

I have found by actual use and tests that the following formula provides such a fuel:—

| | |
|---|---|
| Alcohol | 81.50% |
| Benzol | 10.00% |
| Ethyl ether | 5.00% |
| Naphthalene | 3.50% |

These ingredients are thoroughly commingled and combined by suitable processes of mixing as in a vessel, to form a non-separable, volatile, and readily combustible liquid solution ready at all times for instant carburetion and subsequent use as an atomized fuel of high power and efficiency.

The ingredient benzol in the proportion of 10% of the solution, which is a coal tar product containing hydrocarbons, is used as a solvent, and together with the ethyl ether, adds the necessary volatility to the fuel for use in the carbureter of the motor or gas engine.

Ethyl ether 5%, in gaseous form is first obtained as a by product in the manufacture of alcohol, and is recovered from its gaseous form by condensation in suitable vessels for the purpose. The condensed ethyl ether is used in liquid form as an element of the liquid fuel, and because of its slight cost of production, while it adds but slightly to the expense in manufacturing or compounding the liquid fuel, it at the same time enhances the value and volatility of the fuel.

The element naphthalene of which a proportion of 3.5% is used is added to the solution to enhance its combustibility due to the presence therein of its carbonaceous content. The naphthalene is obtained as a solid in commercial form and is dissolved by heat at a suitable temperature in its preparation for use in the solution. After dissolution by heating of the naphthalene, certain undesirable solids are extracted from the naphthalene solution, as by filtering, and the filtered liquid solution is then mixed and thoroughly commingled with the alcoholic base.

The use of the comparatively inexpensive ethyl ether fills the requirements of, and at the same time eliminates the necessity for the presence of a larger quantity of the more expensive benzol.

By actual practice and use I have demonstrated that a liquid fuel solution as above set forth, when used as a combustible fuel in a gas engine or internal combustion engine, gives an increased power of nearly fifty per cent in volume of fluid over that of gasoline. At the same time the heat developed by combustion and radiated, is greatly reduced, consequently the cylinder piston and engine structure are subjected to a less degree of heat than is usual with gasoline engines, thus permitting the motor to run under more favorable conditions and with greater efficiency. While running under these more favorable conditions the necessity for entire dependence on the circulation of water, the use of the fan, and other cooling agents is materially reduced as compared with existing motors now in use.

While I have specifically set forth the exact proportions of the ingredients which make up the liquid fuel solution, it will be understood that slight variations may be made without departing from the spirit of the invention. In all such cases the several elements of the solution upon being added to the base, saturate and permeate the solution, which thus forms a non-separable but volatile and freely atomized liquid fuel.

Having thus fully described my invention, what I claim and desire to secure by Letters Patent is:—

A liquid fuel solution comprising—

| | |
|---|---|
| Alcohol | 81.50% |
| Benzol | 10.00% |
| Ethyl ether | 5.00% |
| Naphthalene | 3.50% |

In testimony whereof I affix my signatur

ELMER H. RECORDS.